Jan. 7, 1969 J. G. MEYER 3,420,470
BAND RETAINER FOR SATELLITE SEPARATION SYSTEM
Filed Nov. 18, 1966 Sheet 1 of 5

INVENTOR.
JAMES G. MEYER
BY
FOWLER, KNOBBE
& MARTENS
ATTORNEYS.

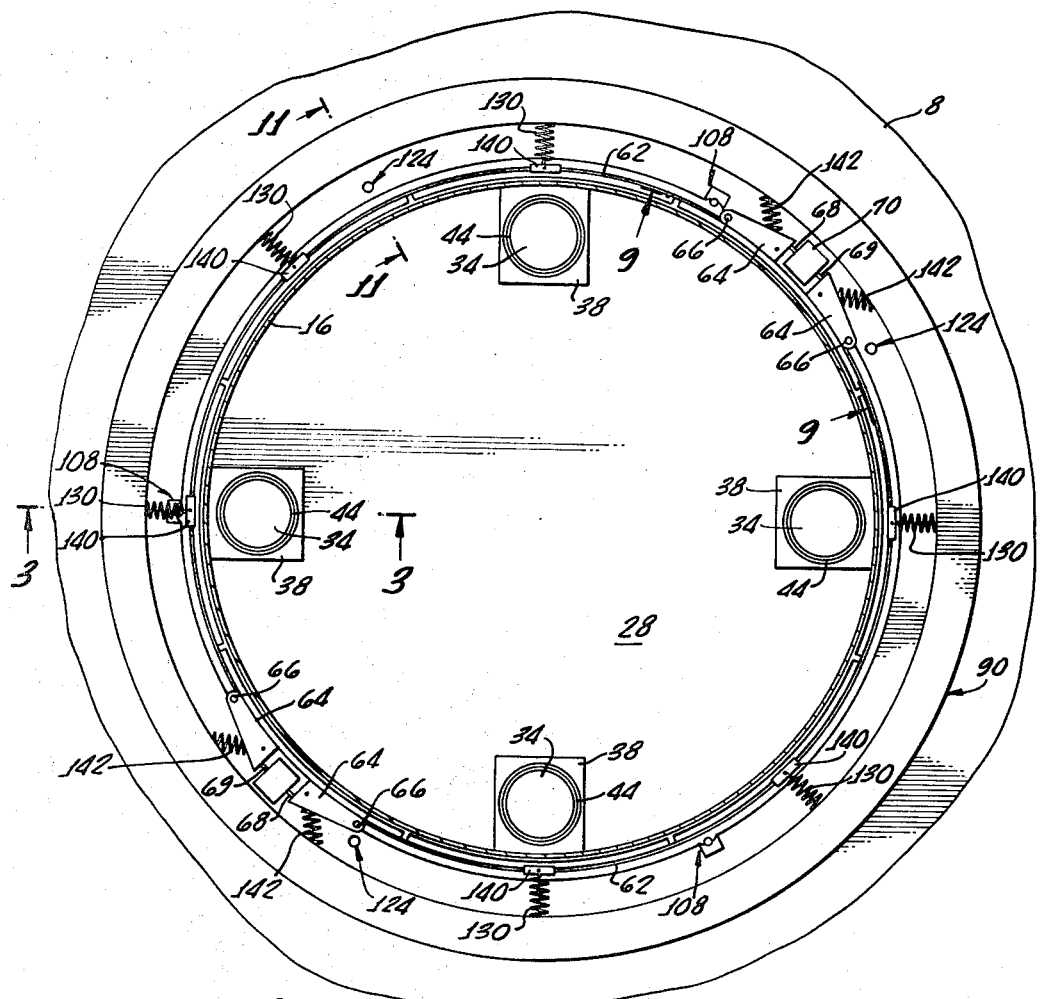

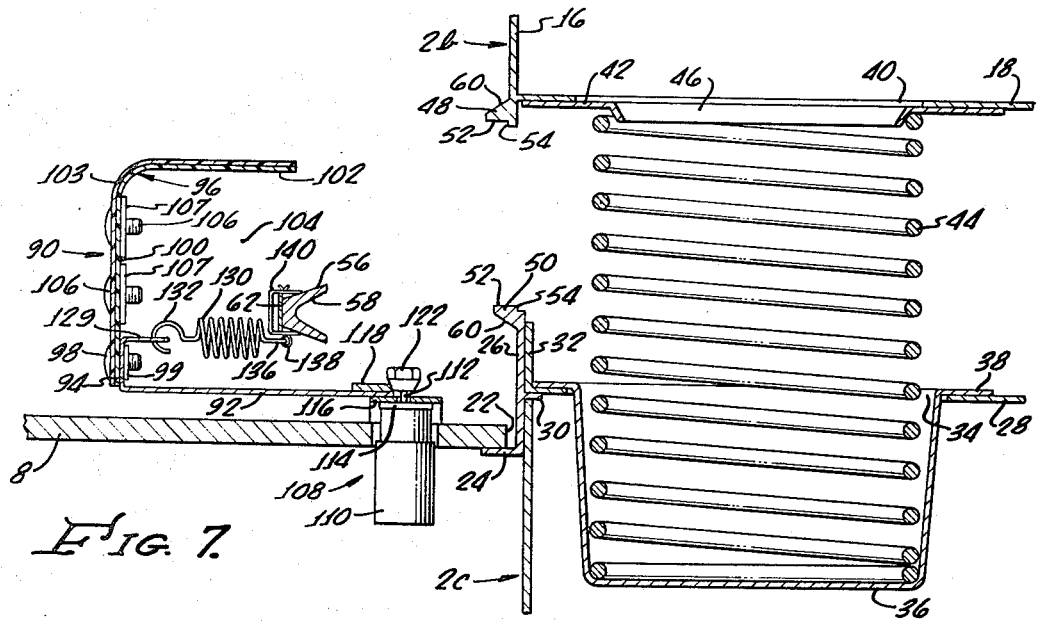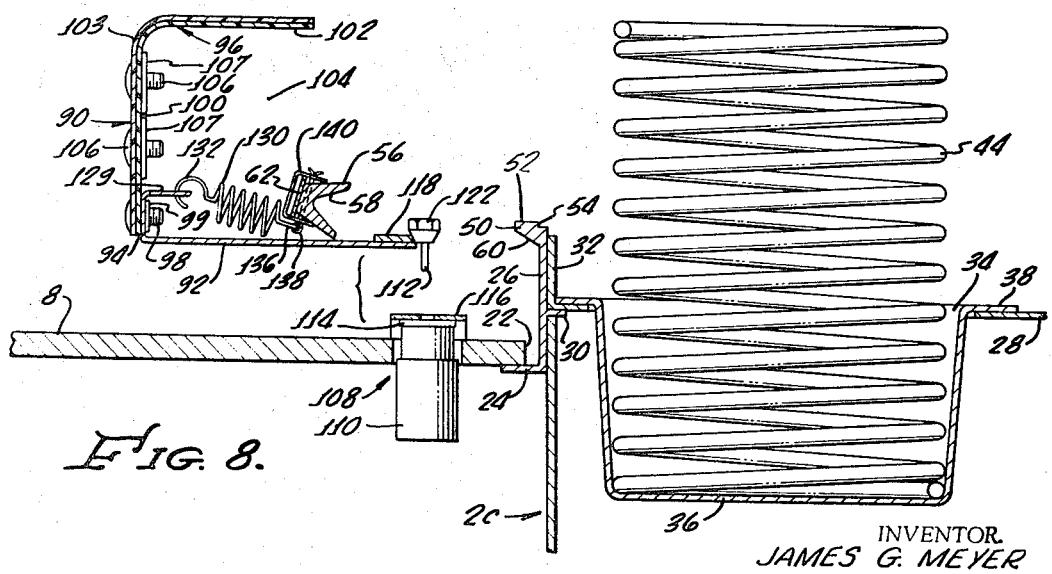

INVENTOR.
JAMES G. MEYER

BY FOWLER, KNOBBE
& MARTENS
ATTORNEYS.

United States Patent Office 3,420,470
Patented Jan. 7, 1969

3,420,470
BAND RETAINER FOR SATELLITE SEPARATION SYSTEM
James G. Meyer, Beverly Hills, Calif., assignor to TRW Inc., Redondo Beach, Calif., a corporation of Ohio
Filed Nov. 18, 1966, Ser. No. 595,427
U.S. Cl. 244—1                          9 Claims
Int. Cl. B64g 1/00

This invention relates to artificial satellites, and, more particularly, to systems for separating stacked satellites in space.

It is sometimes desired to launch a plurality of satellites together, and subsequently separate them in space by remote control. In one system for accomplishing this, the satellites are constructed with machined rings on their ends and are stacked with the rings of two adjacent satellites mating. A tensioned band or strap which extends around the periphery of the mating ends forces clamps to engage lips on the machined rings to hold the satellites together.

When it is desired to separate the stacked satellites in space, a signal is transmitted from the ground to a device on one of the satellites setting off an explosive charge to sever or release the band thereby disengaging the clamps. Compression springs disposed between each two adjacent satellites then force the previously connected satellites apart.

The sudden release of the tension in the band causes it to be thrown laterally away from the satellites, generally following an erratic path. The satellites often have solar panels or other delicate portions on one or both ends which can be seriously damaged by the band as it is thrown from the satellites. In view of the extremely large cost of putting the satellites in space, such damage can be disastrous if it impairs the ability of the satellites to accomplish their mission.

Thus, it is highly desirable that a device be used with the separation system described above which will permit selective separation of the stacked satellites while substantially reducing or eliminating the danger of damage to the satellites. This invention presents a unique solution to the problem by retracting the released band into a housing attached to one of the satellites, rather than permitting the band to fly randomly away from the satellites. After the two satellites have separated, the housing with the band enclosed is jettisoned in a manner which will not cause damage to either satellite.

In accordance with this invention, a torroidal housing member is connected to one of the satellites and disposed around the tensioned band. A plurality of springs connected between the housing and the band cause the band to retract quickly and directly into the housing upon release of the band tension, thereby avoiding damage to the satellites by release of the band.

In the exemplary embodiment disclosed herein, after the satellites have been separated, the housing is jettisoned from the satellite to which it is connected by a remotely controlled explosive device which throws the housing and band away from the satellite in a direction in which it cannot damage either of the satellites. Moreover, the housing is of a special construction which provides for access to the band while the satellites are stacked, in the event that checking or repairs are necessary before lift-off.

Thus, the invention provides a relatively foolproof device for protecting the satellites during the separation phase, which device is completely compatible with the known connecting and separation system described above.

These and other objects and advantages of this invention will be apparent from the following detailed description when read with reference to the accompanying drawings, in which:

FIG. 2 is an enlarged plan view in section taken generally along lines 2—2 of FIG. 1 illustrating the band tensioned around the machined rings of two satellites to join them together and also illustrating the springs for retracting the band into the housing;

FIG. 7 is a view similar to that of FIG. 3 showing the positions of the various elements shortly after the band has been released, with the satellites just separating;

FIG. 8 is a view similar to that of FIG. 7 showing the relationship of the elements when the satellites have been completely separated and the housing has just been jettisoned;

FIG. 10 is a sectional view taken generally along lines 10—10 of FIG. 4 showing a side view of the releasable housing connector;

Figure 1:
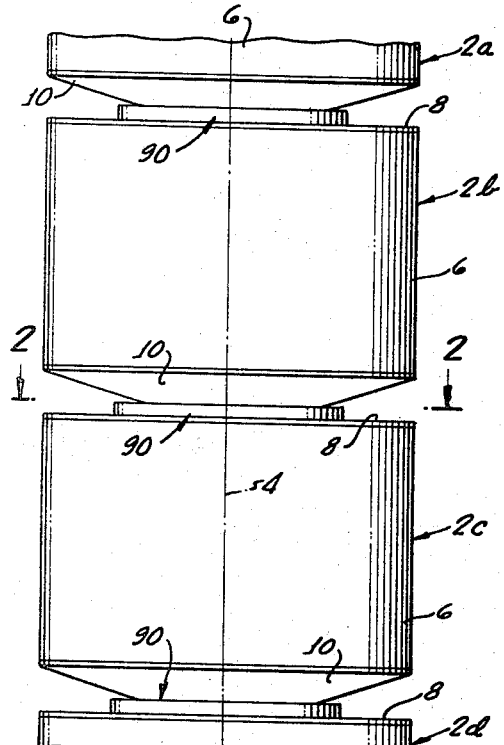
FIG. 1 is an elevation view of a plurality of stacked satellites including band retainers constructed in accordance with this invention.

Referring first to FIG. 1, a plurality of exemplary satellites 2a, 2b, 2c and 2d are stacked and interconnected in end-to-end relationship with their longitudinal axis 4 aligned. Each satellite includes a cylindrical outer shell 6, a relatively flat upper end panel 8 perpendicular to the axis 4, and a frusto-conical lower end panel 10. The terms upper and lower as used herein are only relative and are used with reference to the arrangement of the satellites illustrated in FIG. 1.

Figure 3:
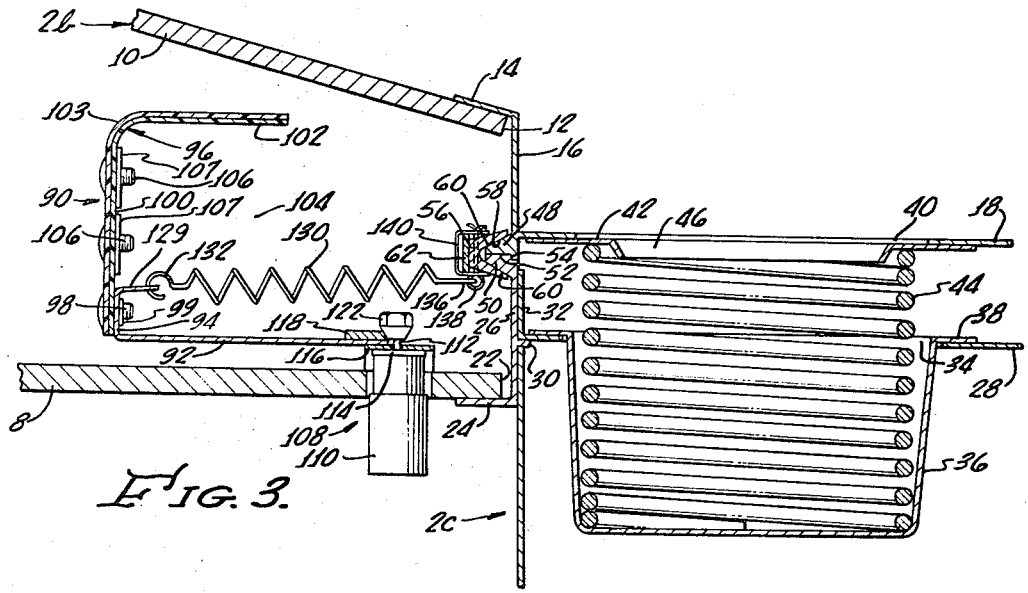
FIG. 3 is a further enlarged partial elevation view in section taken generally along the lines 3—3 of FIG. 2 showing two satellites connected by the tensioned band as well as showing the band retracting and retaining device.

Referring now to FIG. 3, the lower end panel 10 of a typical one of the satellites 2b terminates in an annular inboard edge 12. An outwardly extending lip 14 at the upper end of a cylindrical ring 16 overlaps and is suitably fastened to the lower end plate 10. A bottom plate 18 integral with the ring 16 extends across the area interior of the ring to close the lower end of the satellite.

The upper end panel 8 of a typical satellite 2c also terminates in an annular inner edge 22 to which the outwardly extending flange 24 of a cylindrical ring 26 is attached. A top plate 28 is connected to an inwardly extending flange 30 on the top ring 26 to cover the upper end of the satellite. An upright peripheral flange 32 on the top plate 28 strengthens the structure.

Referring now to both FIGS. 2 and 3, the top plate 28 includes four apertures 34 spaced uniformly about its periphery. A cup 36 is inserted through each aperture 34 and retained in place by an outwardly extending lip 38 suitably affixed to the top plate 28. The bottom plate 18 of the attached satellite 26 has four mating apertures 40 each of which is partially covered by a spring positioning plate 42. A strong compression spring 44 is received in each of the cups 36 and bears against the adjacent spring positioning plate 42 to urge the satellites 2b and 2c apart. A downwardly extending flange 46 on each positioning plate properly aligns the spring 44.

Connector lips 48 and 50 on the adjacent edges of the two rings 16 and 26 each have a machined face 52 which fits in tight abutment with the mating face on the other connector lip. A portion of each of the mating faces 52 is off-set to form a peripheral shoulder 54 which fixes the satellites against relative movement perpendicular to their longitudinal axis 4.

The satellites 2b and 2c are held together by a plurality of arcuately spaced clamping members 56 which are disposed end-to-end around the periphery of the connector lips 48 and 50. Each of the clamps 56 has an inwardly facing surface 58 which is generally V-shaped in cross-sectional configuration. The V-shaped surface 58 engages opposed inclined shoulders 60 on the connector lips to hold the satellites together against the force of the compression springs 44. An elongate band 62, which extends around the clamps 56, is in two parts each extending slightly less than half way around the periphery of the connector lips 48 and 50.

Figure 9:
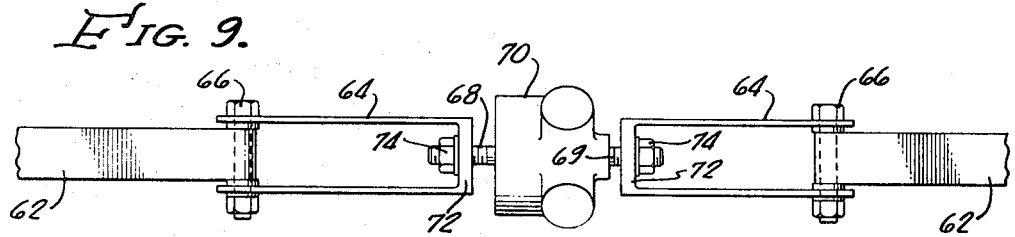
FIG. 9 is an enlarged view taken generally along lines 9—9 of FIG. 2 showing one of the tensioning devices.

Referring to FIG. 9, as well as to FIG. 2, a bracket 64 is affixed to each band end by a rivet or bolt 66 extending through a loop on the end of the band. A threaded bolt 68 or 69 extends from each bracket 64 into a tensioning device 70, the bolts 68 and 69 from each adjacent pair of brackets going into a common tensioning device. Each bolt 68 and 69 extends through an aperture in the end wall 72 of the bracket 64 and is held in place by a nut 74. By drawing up the nuts 74, tension is applied to the bands 62. As the bands are tensioned, the V-shaped clamps 56 are wedged more tightly into engagement with the shoulders on the connector lips 48 and 50 to securely hold the satellites together (see FIG. 3). The one bolt 68 of each tensioner 70 is held in the tensioner by a gripper which is releasable by explosion of a small charge selectively set-off by remote control with a radio signal transmitted from the ground to the satellite. Such control devices and grippers are well-known in the art and will not be described in detail herein.

Referring again to FIGS. 2 and 3, a torroidal housing member 90 is disposed outboard of the tensioned ring 62 between the end panels 10 and 8 of the stacked satellites. The housing 90 includes an annular lower wall 92 disposed perpendicular to the axis 4 of the satellites and terminating at its outboard edge in an upturned flange 94. An L-shaped retaining member 96 fixed to the flange 94 by screws 98 and nut plates 99, includes an upright outboard retaining wall 100 and an upper retaining wall 102 extending inwardly from the upper edge of the outboard wall 100. The L-shaped member 96 together with the lower wall 92 define a U-shaped chamber 104 interior of the housing 90. The L-shaped retaining member is constructed in two separate semi-circular sections with an L-shaped connector plate 103 overlaping each end joint of the semi-circular sections and fastened to both sections by screws 106 and nut plates 107 to connect the sections. The retaining member 96 may be manually attached and removed by removal of the screws 98 and 106 with the satellites stacked to provide access to the interior of the housing for maintenance purposes before lift-off.

Figure 4:
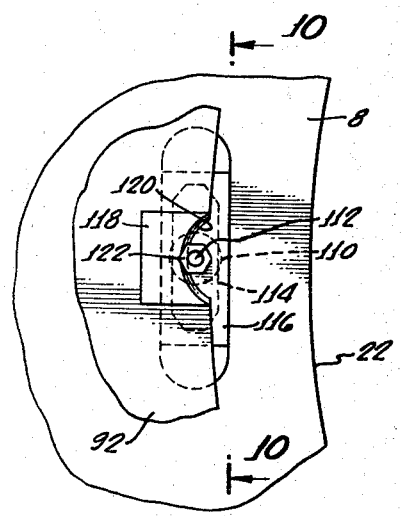
FIG. 4 is partial plan view showing the device for releasably holding the housing on the satellites.
Figure 5:
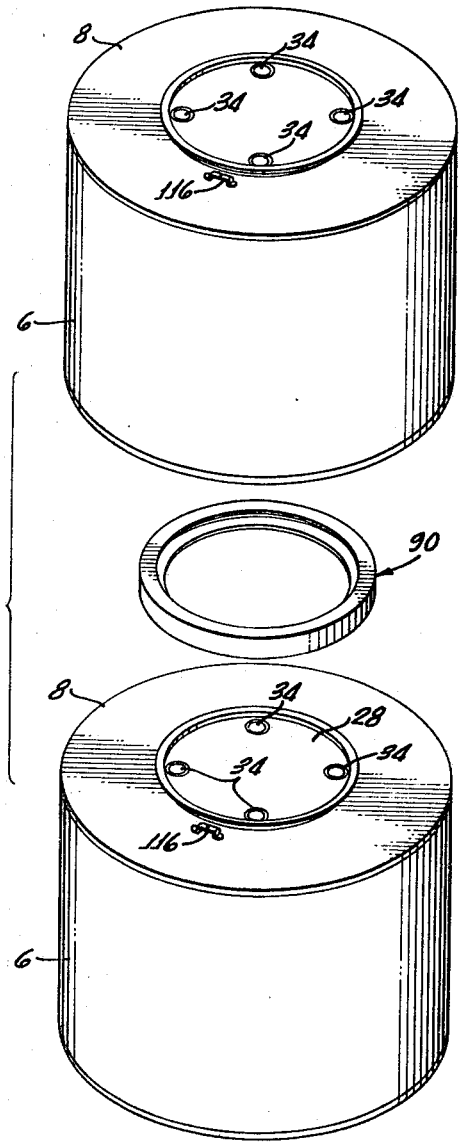
FIG. 5 is a perspective view showing two satellites separated and the housing jettisoned from the satellites.

Referring now to FIGS. 3, 4 and 10, the housing assembly 90 is attached to the upper end panel 8 of the lower satellite 2c by three releasable attachment assemblies 108 disposed uniformly around the housing near its interior edge. Each releasable attachment assembly includes a connector 110 having a bolt 112 extending out of its upper end. The connector 110 includes an enlarged flange 114 which is suitably attached to the underside of a mounting bracket 116 fixed on the upper end panel 8. A reinforcing plate 118 fixed on the lower wall 92 of the housing assembly has an arcuate chamfered edge portion 120 which is engaged by a nut 122 threaded on the bolt 112 to connect the housing assembly to the lower satellite 2c. The lower end of the bolt 112 is gripped in the connector 110 by a mechanism which is released by explosion of a small charge actuated by a ground-controlled radio signal. Such connectors and control mechanisms are well-known in the art and will not be described in detail here.

Figure 11A:
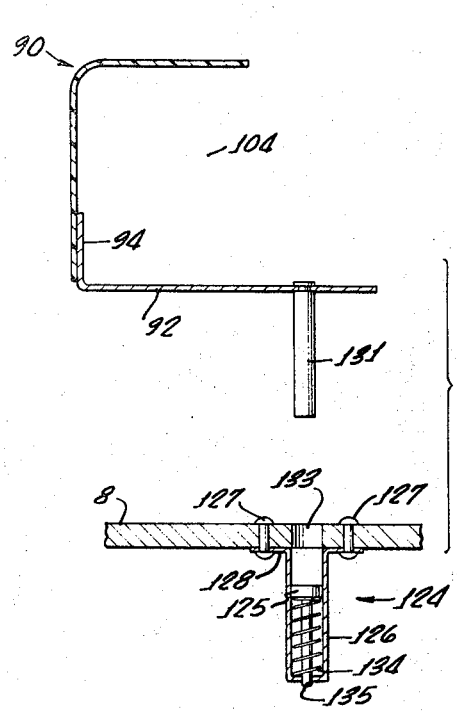
FIG. 11 is an enlarged sectional view taken generally along lines 11—11 of FIG. 2 showing the housing ejection mechanism; and, FIG. 11a is a view similar to that of FIG. 11 showing the mechanism just after it has jettisoned the housing.
Figure 11:
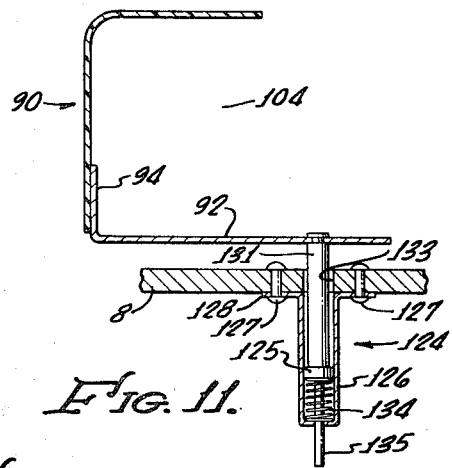

Referring now to FIGS. 2 and 11, a plurality of housing separation assemblies 124 are disposed at arcuately spaced locations around the housing assembly 90. Each separation assembly 124 includes a cup 126 depending from the underside of the upper panel 8 and fixed thereto by fasteners 127 through a flange 128 on the upper end of the cup 126. The cup opening registers with an aperature 133 through the panel 8. A rod 131 fixed to the lower wall 92 of the housing depends into the cup and abuts a piston 125 to compress a housing ejection spring 134 which urges the rod 131 and housing assembly upward. The piston is guided by a depending rod 135 extending through the bottom of the cup 126. In the assembled position, the housing is held down by the attachment 108 described above.

Referring again to FIGS. 2 and 3, six retraction springs 130 are connected between the housing 90 and the tensioned band 62 at spaced points around the periphery of the band to urge the band 62 and clamps 56 into the housing. Each spring 130 is connected to the housing by a hook 132 inserted through a hole in a tab 129 extending inwardly from the flange 94. A hook 136 at the other end of the spring 130 is inserted into the eye of a cotter pin 138 which extends upward through the clamp 56 and a short connecting member 140 of U-shaped cross-sectional configuration. The U-shaped member 140 is thus connected around the band to fix both the band and the clamp to the tension spring 130. An additional four retraction springs 142 are connected between the housing 90 and the brackets 64.

Figure 6:
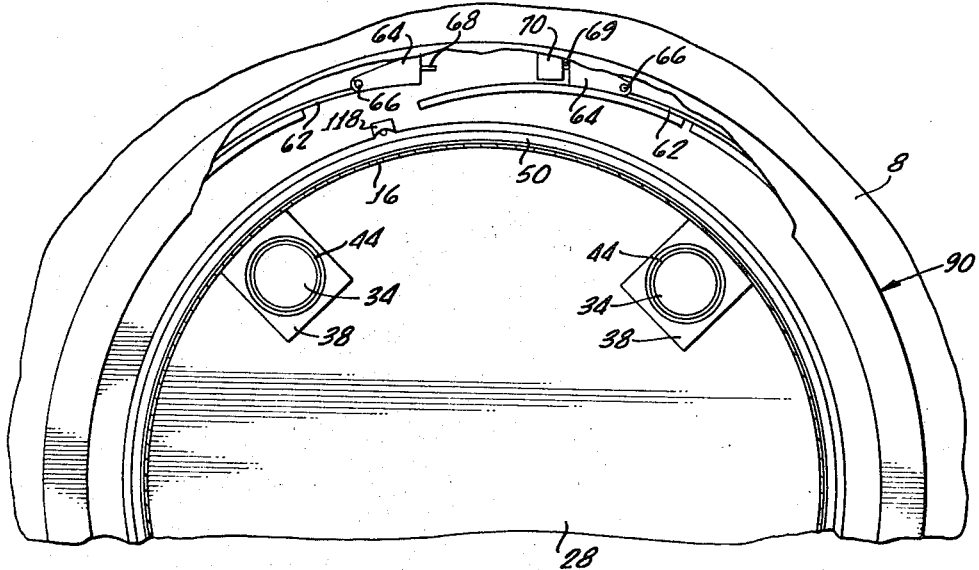
FIG. 6 is a partial plan view in section similar to FIG. 2 showing the position of the band and clamps after the band has been released and retracted interior of the housing.
Figure 9A:
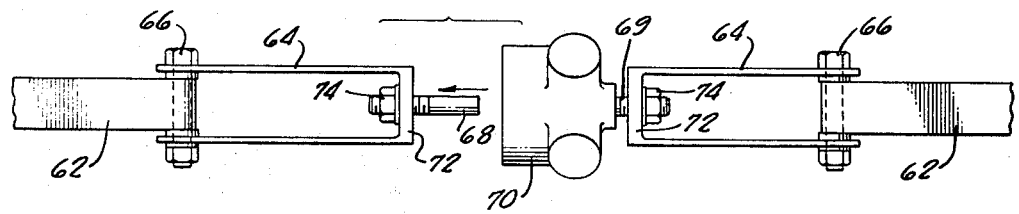
FIG. 9a is a view similar to that of FIG. 9 showing the tensioning device just after it has released the band.

In operation, the stack of satellites 2a–d is shot into space with the band 62 tensioned as shown in FIGS. 2, 3 and 9, the separation springs 44 compressed as shown in FIG. 3 and the ejection springs 134 compressed as shown in FIG. 11. When it is desired to separate adjoining satellites 2b and 2c in space, an appropriate radio signal is transmitted from the ground to actuate the explosive charge of the tensioning devices 70. This releases the gripper to free the bolts 68 from the tensioners 70 and separate the two portions of the band as shown in FIGS. 6 and 9a. The sudden release of tension in the band 62 throws the band and clamps 56 outwardly with a substantial force. As is shown in FIGS. 6 and 7, the retraction springs 130 pull the released band 62 and clamps 56 into the housing 90 rather than permitting them to fly erratically from the connector rings 16 and 26 and possibly damage the satellites. A portion of the impact of the flying band and clamps is absorbed by the outboard wall 100 of the housing which is resilient both because of the material from which it is constructed, and because of its cantilevered mounting. The remainder of the impact is absorbed by the retraction spring 130 on rebound of the band and clamps from the outboard wall 106.

After the momentum of the band 62 and clamps 56 has been absorbed, the housing 90 is no longer necessary and may interfere with accomplishing the mission of the satellite. Therefore, when the two previously connected satellites 2b and 2c have been separated a sufficient distance by the force of the separation springs 44, alone or together with controlled movement of one or the other of the satellites, a radio signal of appropriate frequency is transmitted to trigger the explosive charge in the releasable attachment devices 108 and release the grippers from holding the bolt 112 in the cylinder 110. The ejection springs 134 then force the released housing 90 to separate from the satellite 2c to which it was connected as shown in FIGS. 8 and 11a.

It can be seen from the drawings that separation of one satellite from the other occurs without damage to either satellite, and that the housing is jettisoned so as to strike neither satellite, thereby eliminating the danger of any damage.

I claim:

1. In a satellite system in which at least two satellites are stacked end-to-end and connected by means including a tensioned band extending around at least a portion of the periphery of their mating ends which band is released by remote control to permit the separation of the stacked satellites in space, means for retaining the released band comprising:
   a toroidal housing member disposed outboard of the tensioned band for catching the released band;
   means connecting the housing member to one of the satellites; and,
   spring means connected to the band urging it interior of the housing.

2. In a satellite system, band retaining means in accordance with claim 1, further comprising means for selectively releasing the housing from said one satellite by remote control for jettisoning the housing and band after the other satellite has separated.

3. In a satellite system, band retaining means in accordance with claim 1, wherein the housing includes an annular base wall disposed substantially perpendicular to the length of the satellites, a cylindrical outboard wall extending from the outer portion of the base wall, and an annular retaining wall extending inwardly from the outboard wall to define a U-shaped chamber for receiving the band.

4. In a satellite system, band retaining means in accordance with claim 3, wherein the retaining wall of the housing is removable from the base wall for access to the band.

5. In a satellite system, band retaining means in accordance with claim 4, wherein the retaining wall includes at least two separable arcuate portions so that the retaining wall can be removed manually from the stacked satellites without actuating the jettisoning device.

6. In a satellite system, band retaining means in accordance with claim 3, wherein the housing member is resilient so as to absorb a portion of the impact of the released band.

7. In a satellite system in which at least two satellites are stacked end-to-end with their longitudinal axis aligned;
   circular rings on the adjacent ends of the two satellites in abutting relationship, at least one of said rings having means thereon for engaging the other ring to fix the satellites against relative movement perpendicular to their axis, and each of said rings having an external lip which abuts the lip of the other ring and together form a pair of shoulders converging in the outward direction;
   V-shaped clamping means engaging the converging shoulders to hold the rings in abutment;
   a band affixed to the clamping means and extending around the major portion of the periphery of the rings;
   means for maintaining tension in said band to wedge the clamping means on the converging shoulders;
   ground-controlled means on the satellites for releasing the tension in said band to disconnect the rings;
   spring means for separating the disconnected satellites;
   a toroidal housing disposed outboard of said band and including an annular lower wall disposed generally perpendicular to the satellite axis, a cylindrical outboard wall extending upward from the outboard edge of the lower wall, and an annular upper wall extending inboard from the upper edge of the outboard wall to define an inwardly opening housing of generally U-shaped cross-sectional configuration;
   means affixing said lower wall to one of said satellites, said housing being free of the other adjacent satellite; and,
   a plurality of springs connected to said housing and to said band at arcuately spaced locations thereabouts for retracting said band and clamping means interior of said housing upon release of the band tension.

8. In a satellite system in accordance with claim 7, wherein the housing is cantilevered from the inboard portion of its lower wall so that the outboard wall provides a resilient stop for the band.

9. In a satellite system in which at least two satellites are stacked end-to-end with their longitudinal axis aligned in accordance with claim 7, and further comprising:
   ground-controlled means on said one satellite for releasing said housing from said one satellite after separation of the satellites; and,
   spring means operably connected between the housing and said one satellite to jettison the released housing.

References Cited

UNITED STATES PATENTS

| 3,001,739 | 9/1961 | Faget et al. | 244—1 |
| 3,174,706 | 3/1965 | Wagner | 244—1 |

FERGUS S. MIDDLETON, *Primary Examiner.*

U.S. Cl. X.R.

102—49.5